United States Patent
Fochler

(10) Patent No.: US 7,408,124 B2
(45) Date of Patent: Aug. 5, 2008

(54) WEIGHING CONVEYOR

(75) Inventor: Fritz Fochler, Illerkirchberg (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 0 days.

(21) Appl. No.: 11/405,347

(22) Filed: Apr. 17, 2006

(65) Prior Publication Data

US 2006/0237238 A1    Oct. 26, 2006

(30) Foreign Application Priority Data

Apr. 20, 2005    (DE) .................. 10 2005 018 395

(51) Int. Cl.
*G01G 19/00*    (2006.01)

(52) U.S. Cl. .................................. 177/145

(58) Field of Classification Search ............ 177/145
See application file for complete search history.

(56) References Cited

U.S. PATENT DOCUMENTS

| | | | | |
|---|---|---|---|---|
| 4,238,027 A | * | 12/1980 | Oelte | 177/50 |
| 4,566,584 A | * | 1/1986 | Lindstrom | 177/145 |
| 5,086,855 A | * | 2/1992 | Tolson | 177/5 |
| 5,137,099 A | * | 8/1992 | Tolson | 177/5 |
| 5,236,337 A | * | 8/1993 | Kikuchi et al. | 177/52 |
| 5,326,938 A | * | 7/1994 | Tolson | 177/5 |
| RE34,839 E | * | 1/1995 | Tolson | 177/5 |
| 5,684,275 A | * | 11/1997 | Tolson | 177/119 |
| 5,740,843 A | * | 4/1998 | Burkart | 141/79 |
| 5,929,387 A | * | 7/1999 | Inglin | 177/119 |
| 6,107,579 A | * | 8/2000 | Kinnemann | 177/145 |

* cited by examiner

*Primary Examiner*—Randy W Gibson
(74) *Attorney, Agent, or Firm*—Andrew Wilford

(57) ABSTRACT

A conveyor system has a pair of main conveyor belts having confronting inner stretches oriented horizontally and vertically adjacent one another parallel to a transport direction and extending through a weighing station. The belts are spaced to grip vertical sides of a succession of objects and moved to advance the objects between them in the direction through the weighing station. A weighing conveyor belt has a horizontally oriented and upwardly directed stretch between and underneath the main belts at the station. The main-belt stretches are deflected apart generally only at the station for releasing objects gripped by the main belts and setting them to rest with their full weights on the weighing belt in the weighing station. The weighing belt moves to advance the objects through the weighing station. This way the objects on the weighing belt can be individually weighed.

10 Claims, 2 Drawing Sheets

WEIGHING CONVEYOR

FIELD OF THE INVENTION

The present invention relates to a conveyor. More particularly this invention concerns a conveyor that weighs the objects being conveyed.

BACKGROUND OF THE INVENTION

Conveyors are widely used and are in particular employed in packing machines in which objects are packed into packages such as cartons, boxes or the like and are subsequently shipped off to the client. One way to ensure that a package that has been automatically packed holds the correct number of objects is to weigh it. To do this, the packages typically have to be taken out of production line and passed through a weighing apparatus, then returned to the production line. Such a procedure is fairly complex.

OBJECTS OF THE INVENTION

It is therefore an object of the present invention to provide an improved weighing system.

Another object is the provision of such an improved weighing system that overcomes the above-given disadvantages, in particular that weighs the objects right in the production line.

SUMMARY OF THE INVENTION

This object is achieved according to the invention in a conveyor of the above-described type in which there are two main conveyor belts having confronting vertically and horizontally extending stretches that grip opposite vertical faces of the objects being conveyed. To this end each belt is carried on at least two wheels or drums rotatable about horizontally spaced vertical axes. Furthermore below the pair of belts is a scale provided with its own a weighing belt that is oriented horizontally and perpendicularly to the transport direction. There the two main conveyor belts spread sufficiently to release the objects and let them sit with their full weight directly on the weighing belt. A scale arrangement associated with the weighing belt determines the weights of the objects on this weighing belt. Downstream of the weighing belt the main belts again converge to grip and continue transport of the objects.

Such a design involves the advantage that during the weighing operation, the objects do not leave the handling process, the objects being transported while being gripped between the two main transport belts over the weighing device where the objects are not gripped only during the weighing process. In the transport direction downstream of the weighing device, the two transport conveyor belts again grip the objects, so that the transport operation of the objects with the main conveyor belts is interrupted by the weighing process without the conveyor belts control over the objects remain between the two conveyor belts.

According to a preferred embodiment of the invention, the weighing belt of the weighing device is preceded in transport direction by an intake belt and followed by an output belt. This embodiment has the particular advantage that the weighing operation itself can be conducted without disturbing influences, as at first the objects are deposited on the intake belt and can rest therewith their full weights so that vibrations do not disturb the weighing process on the weighing belt. From the weighing belt, the objects are transferred to the output belt that ensures further transport without vibration of the weighing belt. It is therefore within the scope of the invention that in the area above the intake belt, the inner stretches of the outwardly deflected main belts is effected by two deflection rolls. Thus in the area above the intake belt, the gripping of the objects by the main belts stops and is reestablished at the output belt. This is easily effected by control of the position of the belt inner stretch.

Moreover, it is preferred that the weighing device be mounted in a height-adjustable manner on a support which is disposed the machine frame. This way the objects do not have to be dragged or dropped onto the intake belt or the weigher belt but instead a height adjustment of the weighing device creates a minor distance from the objects so that when the objects are no longer gripped, they only drop a tiny bit. It is indeed possible to limit the drop to few millimeters or even the fraction of a millimeter, but vibrations always occur so that in this embodiment the presence of the intake belt is advantageous, as the objects should be sitting stably by the time they reach the weighing belt.

It is also advantageous when the weighing device is mounted to be adjustable parallel to the transport direction so the possibility exists to assure a central positioning of the objects on the weigher belt or the intake belt respectively.

It is also within the scope of the invention to deflect the inner stretches of both main transport belts so they simply diverge slightly upstream of the weighing station, and both converge downstream. In this manner the objects are not shifted horizontally as they are ungripped and regripped by the main belts before and after weighing.

A further particularly preferred embodiment of the invention is characterized in that the weighing device has a first motor for height adjustment and a second motor for adjustment in the transport direction. A sensor for determining the position and/or the dimensions of the objects which are being transported with the transport belts is provided coupled to a control unit for interpretation of the sensor signals and operating the first and second motors for automatic positioning of the weighing device. This enables an automatized transport of the objects which are moved by the conveyor independent of intervention of a user even when objects of different size are being transported or when they are conveyed to the weighing device via the main conveyor belts with certain variations.

To reduce costs, it is thereby provided that the control unit is integrated into the machine control of a packing machine.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
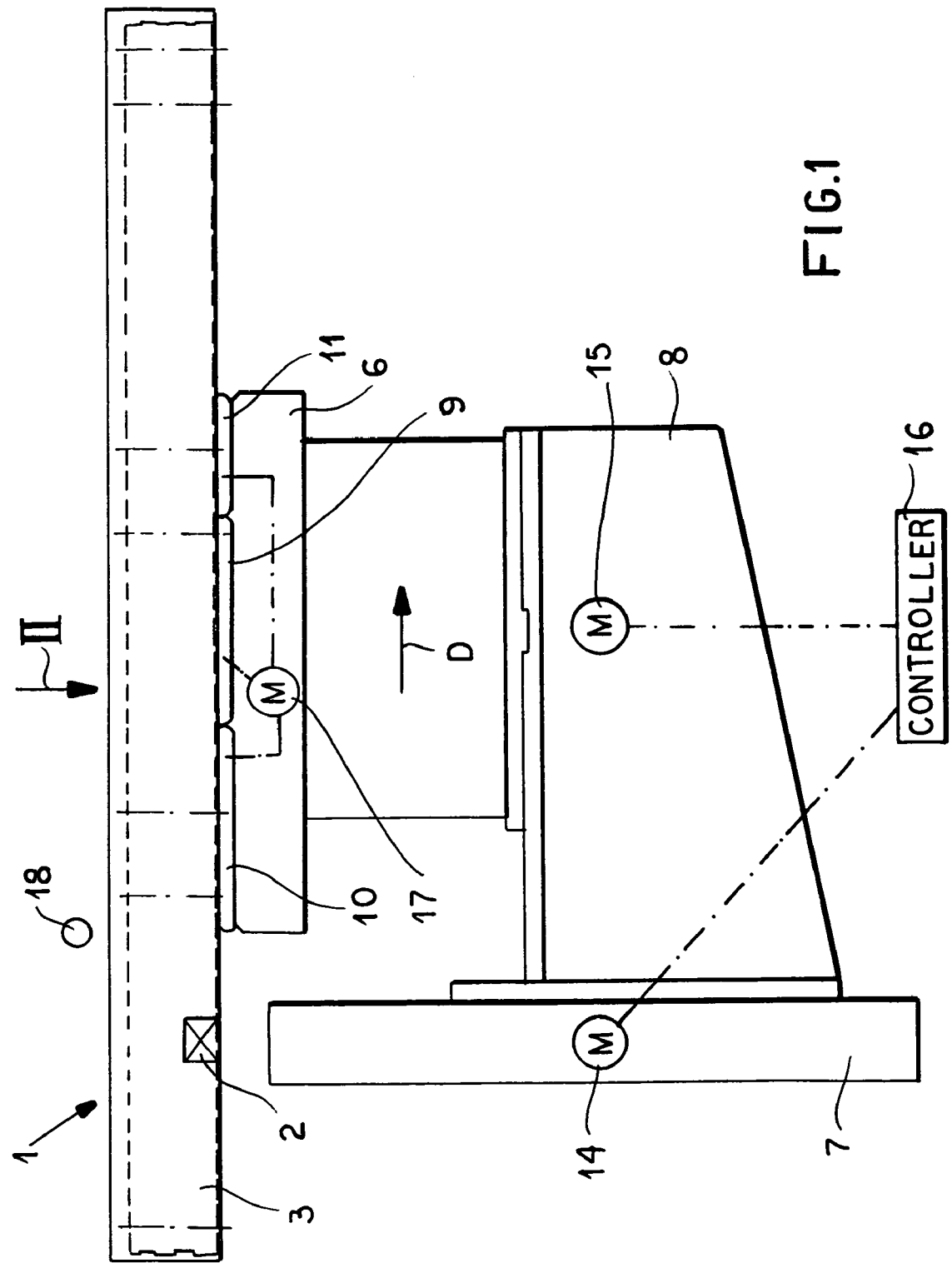
FIG. 1 is a partly diagrammatic side view of the weighing conveyor according to the invention.
Figure 2:
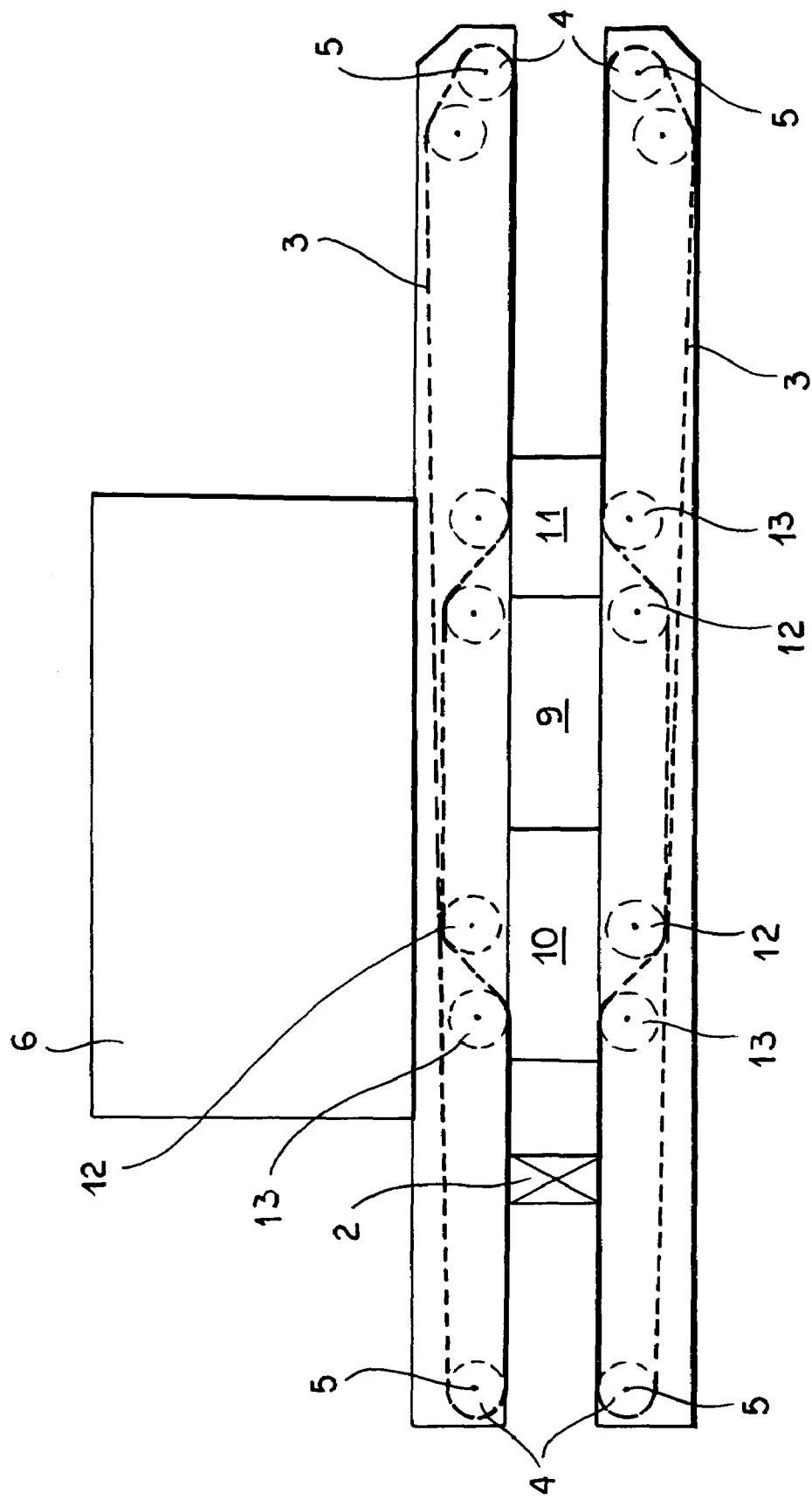
FIG. 2 is a top view taken in the direction of arrow II of FIG. 1.

As seen in FIGS. 1 and 2 a conveyor 1 is used for example in packing machines, for moving off objects 2, e.g. filled cartons, produced by the packing machine at the end of the production process. The conveyor 1 comprises two main conveyor belts 3, which are carried on rollers 4 centered on vertical axes 5 and thus each form an inner stretch directed horizontally at the inner stretch of the opposite transport belt 3 and an external stretch. Below the two transport belts 3 there is a weighing device 6 mounted in a height-adjustable manner on a support 8 which is disposed on a machine frame 7 of the packing machine. The weighing device 6 is also movable by a motor 15 in and against a transport direction D of the objects 2. The weighing device 6 has a weigher belt 9 which is revolving around two unillustrated rollers that are spaced horizontally and extend perpendicular to the transport direction D. An intake belt 10 is immediately upstream of the belt 9 and an output belt 11 is immediately downstream. The belts 9, 10, and 11 are operated synchronously by a motor 17 so their upper stretches move at the exact same speed as the inner stretches of the belts 3.

As can be seen especially from FIG. 2 immediately upstream of the weigher belt 9 and above the intake belt 10 the inner stretch of at least one of the transport belts 3, here both of them, is deflected outward by a roller pair 12, 13. Similarly downstream of the weigher belt 9 and above the output belt 11 the two inner stretches are deflected back inward. As a result the objects 2 are gripped on opposite vertical sides by the belts 3 upstream and downstream of the weigher belt 9, but in the weighing station formed by this belt 9 they are not held and rest with their full weights on the belt 9.

To prevent the objects 2 from dropping two far as the belts e are deflected apart upstream of the weigher belt 9, the weighing device 6 is mounted in a height-adjustable manner, with the height set by a motor indicated schematically at 14. From the intake belt 10, the objects 2 are transferred to the weigher belt 9 and weighed there, then they are transferred to the output belt 11. The objects are carried off from the output belt 11 by the two transport belts 3 whose inner stretches grip the objects 2.

In order to automate the process, the first motor 14 for height adjustment and the second motor 15 for the adjustment in the transport direction D are connected with a sensor 17 provided for the recognition of the position and/or the dimensions of the objects 2 to a control unit 16 for interpreting the sensor signals and operating the first and second motor 14 and 15 for the automatic positioning of the weighing device 6. The control unit 16 is integrated into the machine control of the packing machines.

I claim:

1. A conveyor system comprising:
   a pair of main conveyor belts having confronting inner stretches oriented horizontally and vertically adjacent one another parallel to a transport direction and extending through a weighing station, the belts being spaced to grip vertical sides of a succession of objects;
   means for advancing the main belts and displacing the objects between them in the direction through the weighing station;
   a weighing conveyor belt having a horizontally oriented and upwardly directed stretch between and underneath the main belts at the station;
   means for deflecting the main-belt stretches apart at an upstream location immediately upstream of the weighing belt, for holding the main-belt stretches apart in the weighing station, and for deflecting the main-belt stretches back together at a downstream location immediately downstream of the weighing belt for releasing objects gripped by the main belts and setting them to rest with their full weights on the weighing belt in the weighing station and for gripping the objects again downstream of the weighing station with the main belts not touching the objects when they are on the weighing belt;
   drive means for advancing the weighing belt and thereby advancing the objects through the weighing station; and
   means associated with the weighing belt for weighing the objects on the weighing belt.

2. The conveyor system defined in claim 1, further comprising:
   an intake conveyor belt having a horizontally oriented and upwardly directed stretch between and underneath the main belts immediately upstream of the weighing belt; and
   an output conveyor belt having a horizontally oriented and upwardly directed stretch between and underneath the main belts immediately downstream of the weighing belt, both the intake and output belts being connected to the drive means for movement synchronously with the weighing belt.

3. The conveyor system defined in claim 1 wherein the means for deflecting includes vertically oriented rollers engaging the inner stretches of the main belts upstream of the weighing station.

4. The conveyor system defined in claim 3 wherein the means for deflecting includes vertically oriented rollers engaging the inner stretches of the main belts downstream of the weighing station.

5. The conveyor system defined in claim 1, further comprising
   means for adjusting a vertical position of the weighing belt.

6. The conveyor system defined in claim 1, further comprising
   means for adjusting a position of the weighing belt in the transport direction.

7. The conveyor system defined in claim 1 wherein the deflecting means also deflects the main-belt stretches together downstream of the station for regripping the objects.

8. The conveyor system defined in claim 1, further comprising
   means for adjusting a vertical position of the weighing belt;
   means for adjusting a position of the weighing belt in the transport direction;
   means including a sensor for detecting a position of the objects upstream of the station; and
   control means connected to the sensor and to the means for adjusting for setting the weighing band to receive the objects.

9. The conveyor system defined in claim 8 wherein the control means is part of a packaging machine.

10. A conveyor system comprising:
    a pair of main conveyor belts having confronting inner stretches oriented horizontally and vertically adjacent one another parallel to a transport direction and extending through a weighing station, the belts being spaced to grip vertical sides of a succession of objects;
    means for advancing the main belts and displacing the objects between them in the direction through the weighing station;
    a weighing conveyor belt having a horizontally oriented and upwardly directed stretch between and underneath the main belts at the station;
    an intake conveyor belt having a horizontally oriented and upwardly directed stretch between and underneath the main belts immediately upstream of the weighing belt;
    an output conveyor belt having a horizontally oriented and upwardly directed stretch between and underneath the main belts immediately downstream of the weighing belt;
    drive means for advancing the weighing belt synchronously with the intake, output, and main belts and thereby advancing the objects through the weighing station;
    means for deflecting the main-belt stretches apart at an upstream location upstream of the weighing belt and along the intake belt, for holding the main-belt stretches apart and out of contact with the objects in the weighing station, and for deflecting the main-belt stretches together at a downstream location downstream of the weighing belt and along the output belt for releasing objects gripped by the main belts and setting them to rest with their full weights on the weighing belt in the weighing station with the mail belts out of contact with the objects while on the weighing belt and for gripping the objects with the main belts again downstream of the weighing station; and means associated with the weighing belt for weighing the objects on the weighing belt.

* * * * *